United States Patent
Stringer-Calvert et al.

(10) Patent No.: US 7,177,867 B2
(45) Date of Patent: Feb. 13, 2007

(54) METHOD AND APPARATUS FOR PROVIDING SCALABLE RESOURCE DISCOVERY

(75) Inventors: David W. J. Stringer-Calvert, Santa Clara, CA (US); Patrick D. Lincoln, Woodside, CA (US); Steven M. Dawson, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 294 days.

(21) Appl. No.: 10/242,285

(22) Filed: Sep. 12, 2002

(65) Prior Publication Data

US 2003/0074402 A1  Apr. 17, 2003

Related U.S. Application Data

(63) Continuation-in-part of application No. PCT/US00/29290, filed on Oct. 23, 2000.

(60) Provisional application No. 60/322,970, filed on Sep. 12, 2001.

(51) Int. Cl.
*G06F 17/30* (2006.01)
(52) U.S. Cl. .............................. 707/9; 707/3; 707/100
(58) Field of Classification Search .............. 707/1–10, 707/100–104.1, 200–205; 709/220–224, 709/203, 226
See application file for complete search history.

(56) References Cited

U.S. PATENT DOCUMENTS

| 5,515,510 | A  | * | 5/1996 | Kikinis ...................... 709/203 |
| 5,586,261 | A  | * | 12/1996 | Brooks et al. .............. 709/238 |
| 6,047,327 | A  | * | 4/2000 | Tso et al. ................... 709/203 |
| 6,067,545 | A  | * | 5/2000 | Wolff .......................... 707/10 |
| 6,067,572 | A  | * | 5/2000 | Jensen et al. ............... 709/241 |
| 6,105,027 | A  | * | 8/2000 | Schneider et al. ............ 707/10 |
| 6,161,139 | A  | * | 12/2000 | Win et al. ................... 709/225 |
| 6,282,281 | B1 | * | 8/2001 | Low ........................... 709/219 |
| 6,662,221 | B1 | * | 12/2003 | Gonda et al. ............... 709/203 |
| 6,671,724 | B1 | * | 12/2003 | Pandya et al. .............. 709/226 |
| 6,779,030 | B1 | * | 8/2004 | Dugan et al. ............... 709/223 |
| 6,845,393 | B1 | * | 1/2005 | Murphy et al. ............. 709/224 |
| 6,879,984 | B2 | * | 4/2005 | Duddleson et al. ......... 707/101 |
| 2002/0027567 | A1 | * | 3/2002 | Niamir ....................... 345/738 |
| 2002/0055924 | A1 | * | 5/2002 | Liming ....................... 707/100 |
| 2002/0059264 | A1 | * | 5/2002 | Fleming et al. ............. 707/100 |
| 2002/0107982 | A1 | * | 8/2002 | Teodosiu et al. ........... 709/203 |
| 2003/0154279 | A1 | * | 8/2003 | Aziz ........................... 709/225 |
| 2004/0083289 | A1 | * | 4/2004 | Karger et al. ............... 709/226 |

* cited by examiner

*Primary Examiner*—Mohammad Ali
(74) *Attorney, Agent, or Firm*—Kin-Wah Tong, Esq.; Patterson & Sheridan, LLP

(57) ABSTRACT

A scalable method and architecture for efficiently locating desired resources within a network containing a plurality of server nodes, each of which hosts or otherwise provides access to a subset of a global resource set. In one aspect of the invention, each of the server nodes are assigned membership in at least two sets, an "announce" set and a "request" set.

114 Claims, 6 Drawing Sheets

METHOD AND APPARATUS FOR PROVIDING SCALABLE RESOURCE DISCOVERY

This application is a continuation-in-part of International Application serial number PCT/US00/29290, filed on Oct. 23, 2000, which is herein incorporated by reference. This application also claims the benefit of U.S. Provisional Application No. 60/322,970 filed on Sep. 12, 2001, which is herein incorporated by reference.

The invention was made with Government support under Grant Number N00014-01-1-0837 awarded by the Office of Naval Research. The Government has certain rights in this invention.

The present invention relates to an apparatus and concomitant method for providing resource discovery services. More specifically, the present invention provides a new architecture where directory servers are organized in an n-dimensional grid or set of sets of servers, where registration occurs in one dimension of the grid and lookup occurs in another dimension of the grid.

BACKGROUND OF THE DISCLOSURE

The number of information systems that provide the capability to store and retrieve large amounts of data and other resources continues to grow. For such systems, the architecture and methodologies employed by the system have a significant impact on the performance and reliability of the system.

In a non-networked system, resource lookup and addressing is simple. For example, to locate a printer the system simply checks its configuration for a directly connected printer. In networks of computer systems, resource location becomes much more difficult.

A common model for resource lookup is one in which a requesting computer system asks all computer systems on the network if they hold the required resource (where "resource" encompasses data, programs, hardware, and so on). For example, a computer requiring a printer on a local area network (LAN) may broadcast a request to all nodes on the LAN when it requires a printer, following which systems offering printing services will reply to the originating node. However, this approach is not scalable to large networks because it would be inconceivable to ask every computer on the Internet for the location of a particular data file, for example.

Many information systems utilize a centralized storage model in which all the available resources are listed in a single index, which is stored on a single centralized storage system ("server"), with which all other systems ("clients'") must communicate in order to access the information. For example, to locate a printer in a local area network (LAN) a client may contact the master server which has knowledge of all of the printing resources within the LAN.

The use of such a centralized model is not, however, desirable under all circumstances. If the centralized storage system is networked to the client systems by a small number of relatively narrow communication channels, the amount of data being transferred to and from the storage system may exceed the capacity of the communication channels. Another difficulty often encountered in a network environment is low network performance (a high "latency", or information transit time) as data traverses the network when traveling between the client systems and the centralized storage system. Another difficulty arises from the need to provide a storage system having sufficient capacity to store all of the resource locations. Yet another difficulty arises from the decreased reliability which results from storing all of the resource locations on a single system, i.e. the central system is a single point of failure.

Such deficiencies of resource lookup in large networks, such as the World Wide Web (WWW), has led to the creation of search engines, web indexes, portals, and so forth. Web indexes and search engines operate much as the previously described central index, and rely on a process whereby resource locations are inserted (manually or automatically) into the index. However, these still suffer from the deficiency of being a central index as described earlier. In summary, the centralized model is not scalable to large networks.

Current approaches to solving this problem for networks such as the Internet involve replicating the centralized index across a plurality of servers, but this has the deficiency that the indices must be kept synchronized, which is not scalable to vast resource sets or large networks. In addition, the replication approach typically entails replication of hardware sufficient to host the entire index at each replicated location. For large indices this may imply a significant additional cost burden that further impairs scalability.

Although the inadequacies of existing resource lookup methods have been previously recognized, and various solutions have been attempted, there has been and continues to be a need for improved resource lookup systems. Of particular interest here is a solution enabling efficient location and retrieval of an item from a resource set which is vastly distributed.

SUMMARY OF THE INVENTION

The present invention is directed to a scalable method and architecture for efficiently locating desired resources within a network containing a plurality of server nodes, each of which hosts or otherwise provides access to a subset of a global resource set. In one aspect of the invention, each of the server nodes is assigned membership in at least two sets, an "announce" set and a "request" set. Efficiency is obtained by taking advantage of this assignment to significantly limit the number of nodes that must be queried in order to locate any desired member or subset of the global resource set.

In one embodiment, retrieval of a plurality of resources distributed across an electronic network which includes a plurality of interconnected resource nodes, each of the resources being associated with at least one corresponding resource node may be accomplished by (1) assigning to each of the resource nodes membership in at least one of a plurality of announce sets; and (2) assigning to each of the resource nodes membership in at least one of a plurality of request sets, such that each of the request sets intersects with every one of the announce sets thereby forming a logical grid. In some instances it may be beneficial to include the following steps: (3) informing the members of the announce sets of the resources corresponding to all members of the same announce set; (4) requesting a desired resource; and (5) locating the desired resource by querying the members of at least one of the request sets but not all of the request sets.

The present invention provides a scalable resource discovery service that occupies a middle ground between a central directory and full replication of directory services. In one embodiment, the overall system allows for $O(\sqrt{n})$ publication and lookup cost. However, with information about orderings over resources or hash functions, the present invention can obtain $\log(n)$ or even constant time lookups at the expense of slightly greater publication cost. The present invention can be implemented to support a delegated computing approach to the semantic web. This approach will provide the foundations for distributed agent services, thereby transforming the web from its current status as an information resource into a computing resource that is capable of independently solving complex problems.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
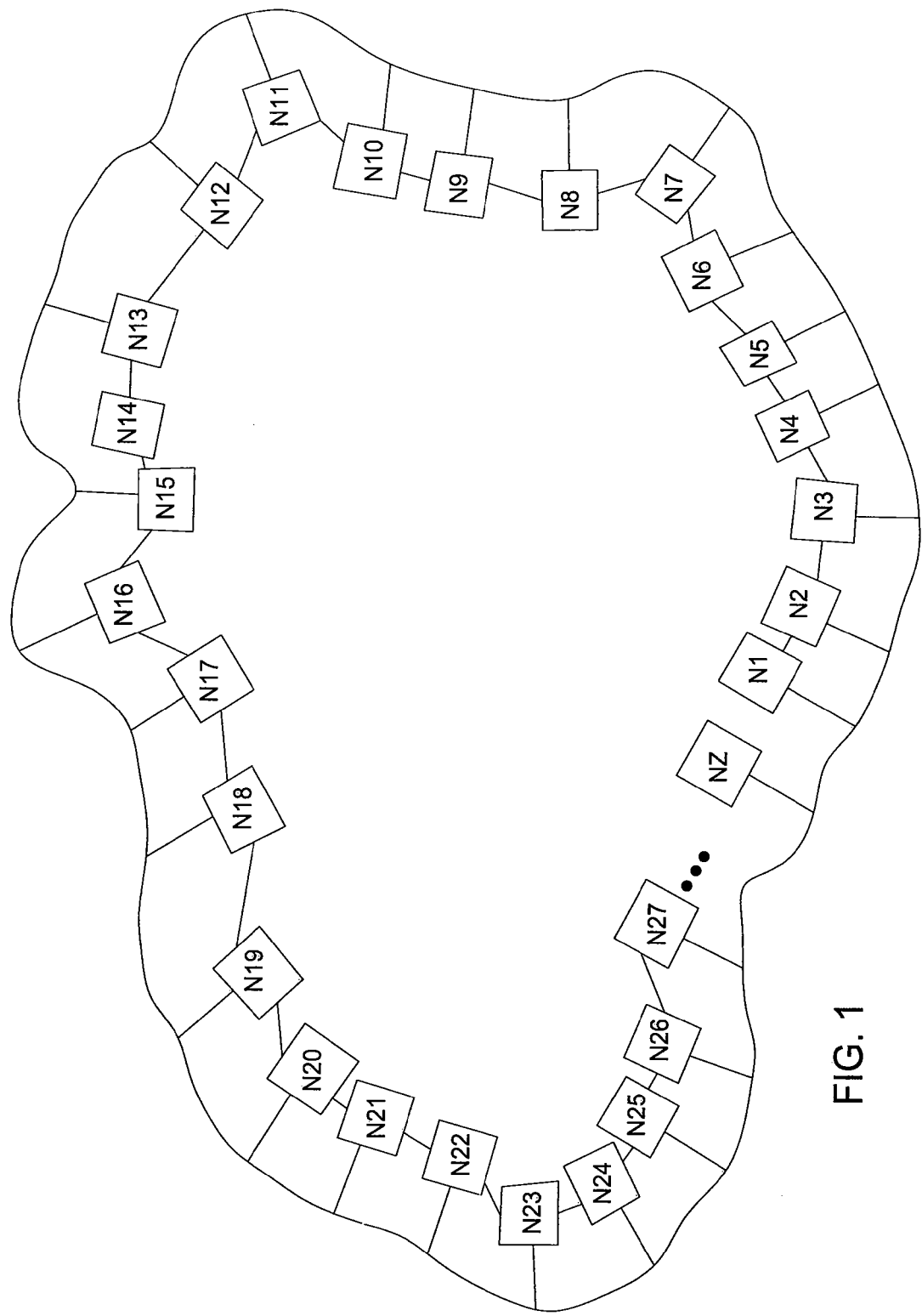
FIG. 1 is a schematic view of a network of nodes, a portion of which is used to store a dataset.

In FIG. 1, a network comprises nodes N1–NZ, wherein server nodes N1–N27 are used to host (or otherwise access, such as by pointer) a particular global resource set. It should be noted that the term "node" as used herein is not limited to any particular number or arrangement of computers or other devices but consists of any device or group of devices on which information can be stored and from which information can be retrieved. Thus, a node may comprise a single device, a group of devices, a number of devices networked together, or a network comprising multiple sub-networks. A partial list of potential devices may include hand-held devices such as cell phones, personal data assistants, and even appliances such as toasters and washing machines. For nodes that comprise multiple machines, distribution of information among the machines of the node may be done according to the methods disclosed herein, resulting in a hierarchical embodiment of the present invention.

It should be noted that the present invention discloses a scalable method and architecture for efficiently locating desired resources within a network that contains a plurality of server nodes. Thus, various methods that are disclosed below can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory of a computer (e.g., a server node). As such, the various methods of the present invention can be stored on a computer readable medium, e.g., RAM memory, magnetic or optical drive or diskette and the like. Although the elements of a CPU, a memory and other input/output devices are not specifically shown, those skilled in the art will realize that any one of the server nodes or a dedicated node for managing the network will embody these basic elements.

In a preferred embodiment of the present invention, each server node N1–N27 is assigned membership in least one of a plurality of sets of "request" nodes, as well as membership in at least one of a plurality of sets of "announce" nodes. The assignment is made in such a manner that each one of the plurality of sets of request nodes intersects each one of the plurality of announce sets. In other words, any given announce set and request set pair will share at least one server node in common. The allocation of server nodes can be accomplished, for example, by assigning each server node a set of coordinates corresponding to a point in an imaginary 2-dimensional spatial coordinate system and utilizing the assigned coordinates to assign the server nodes to the sets of announce nodes and request nodes. Although the coordinates may be arbitrarily assigned, the assignment of coordinates may be related to factors such as whether it is in direct connection with another node. In some embodiments, coordinates may be assigned so that there is direct connectivity between non-orthogonally adjacent nodes.

Figure 4:
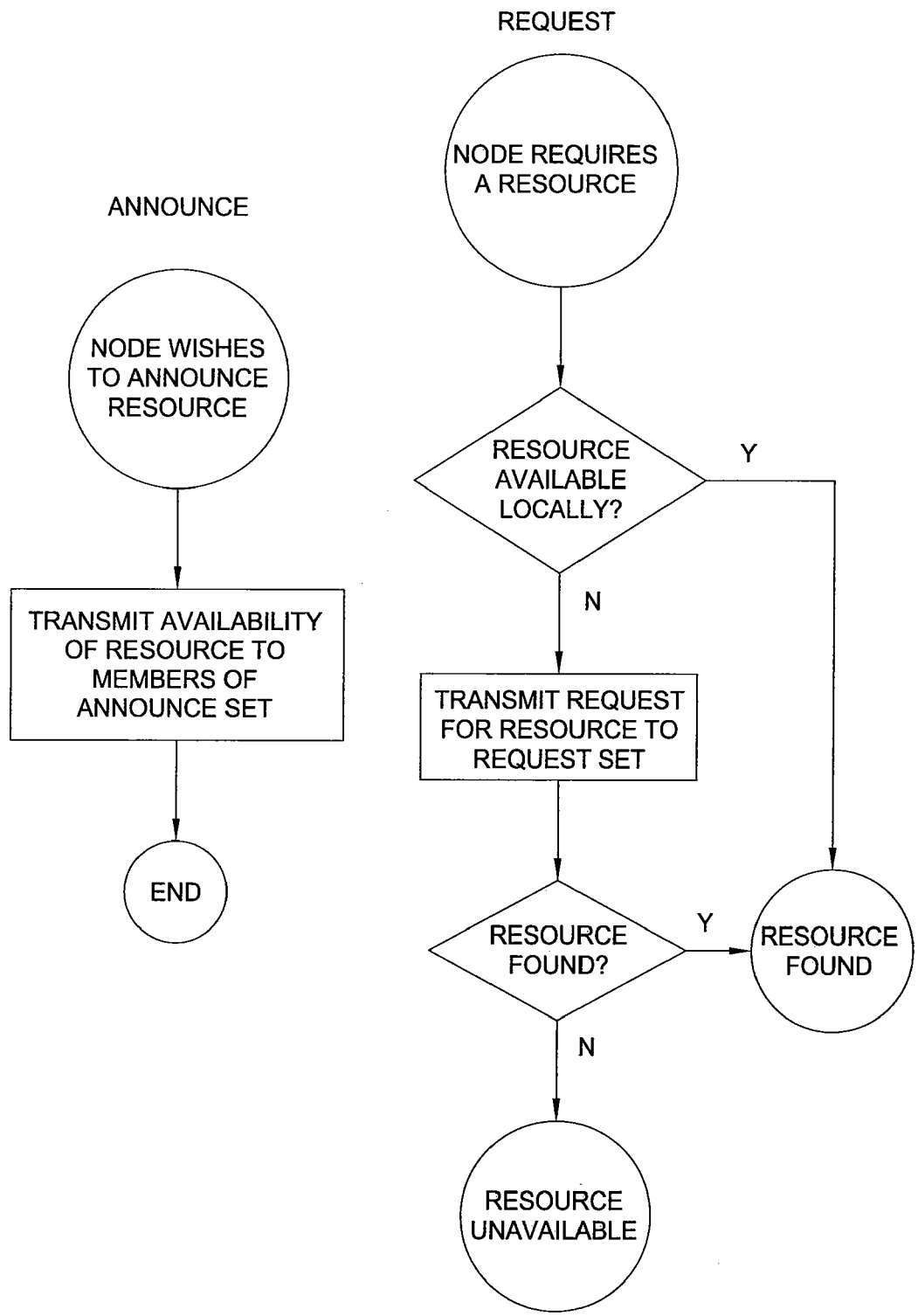
FIG. 4 is a flow diagram of a method in accordance with the present invention.

Each server node announces, advertises, updates or publishes the availability of its associated resources simply by informing the other members of its assigned announce set. It should be noted that the terms "announce", "advertise", "update", and "publish" are used interchangeably in the present disclosure to denote the broadcast of the availability of a resource. Consequently, determining the availability and/or characteristics of any desired resource by identifying its corresponding server node (hereinafter sometimes simply "locating" the resource) is greatly facilitated. Because the plurality of announce sets and the plurality of request sets are defined such that any selected request set intersects every announce set, as stated above, it is guaranteed that if an announcement of resource availability was made by any of server nodes N1–N27, then at least one member node of each request set will have been informed of that announcement. Therefore, in order to locate a desired resource, it is only necessary to query the members of any single request set. (In particular, in the worst case all nodes of a chosen request set might need to be queried; however in some embodiments, as described further below, the member nodes of the request set may be queried in an ordered manner, such that only a subset of the request set will generally need be queried.) In FIG. 4, a flow diagram of the above process is presented.

Note that revocation of resource availability can be announced in a similar manner to announcement of resource availability, simply by removing the previous announcement from all nodes belonging to the revoking node's announce set.

Figure 2:
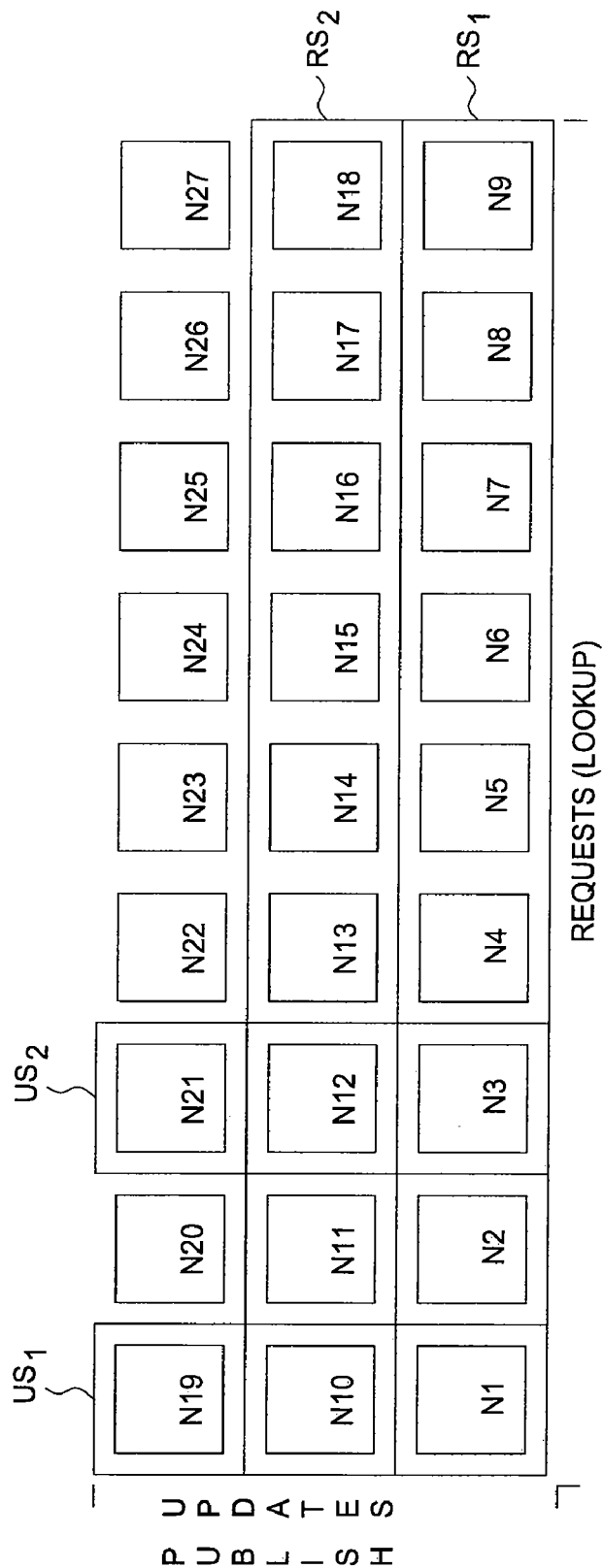
FIG. 2 is a view of a logical 2×2 grid showing server nodes assigned to announce and lookup sets.

In FIG. 2 a 3×9 grid formed by using a 2-dimensional spatial coordinate system to assign coordinates to server nodes N1–N27 is shown. The coordinates of the server nodes correspond to the row and column in which they are located. Having assigned coordinates to the nodes, dividing the nodes into request sets and announce sets can be accomplished in a straightforward fashion by utilizing each row as an announce set and each column as a request set for the node at the intersection of the row and column. Thus, the request set US1 for N1 includes all the nodes in column 1, namely N1, N10, and N19, and the announce set RS1 for N1 includes all the nodes in row 1, namely N1–N9. Similarly, the request set US2 for N12 includes all the nodes in column 3, namely N3, N12, and N21, and the announce set RS2 for N12 includes all the nodes in row 2, namely N10–N18. Thus, within the context of a rigid two dimensional grid, "row" and "column" are described as being alternate terms for "announce set" and "request set", but this may not be the case if the grid is increased beyond two dimensions.

Although the grid formed in FIG. 2 does not contain an equal number of rows and columns, in the case where there is no useful ordering on the items or indices, it is preferred that when feasible an approximately equal number of rows and columns be used, and that each row contains approximately the same number of server nodes. If it is not feasible to utilize an equal number of rows and columns, then it is still preferred that the number of rows and columns, and the number of server nodes in each row and column differ only by some small fixed constant factor. To satisfy this preference, nodes would likely have to be added and/or removed a row or column at a time. If the number of update nodes available does not allow for an equal division into request sets and announce sets, some nodes may be designated as members of multiple sets so as to fill out the empty places in the set. Server nodes may also be members of multiple logical grids. In other words, a given server node may have multiple assigned update and request sets where each pair of request and announce sets is specific to a particular dataset. If the number of request and announce actions are unequal, the target ratio of number of servers in each row and column can be made to vary to improve overall performance. The target ratio can be made to vary dynamically based on experienced balance of announce versus request actions, or it could be fixed based on historical data.

It should be noted that not all of the nodes of FIG. 1 are represented in FIG. 2. For example, it is contemplated that nodes communicatively coupled to the server nodes may exist which are not themselves server nodes. Similarly, a node communicatively coupled to the server nodes may be a member of one or more request sets without being a member of an announce set, or may be a member of one or more announce sets without being a member of a request set. Moreover, rows and columns may use diagonals and rows or some other mechanism for assigning nodes to request sets and announce sets, so long as each request set contains at least one member from each of the announce sets.

It should further be noted that the representation of the server nodes in a 2-dimensional grid in FIG. 2 is merely a convenient form for representation, and is not a limitation of the present invention to server nodes that form such a 2-dimensional logical grid. Alternative embodiments may arrange nodes in a D-dimensional logical grid, in which nodes are still assigned membership in announce sets and request sets. For example, in FIG. 3 a 3×3×3 cube is formed by using a 3-dimensional spatial coordinate system to assign coordinates to storage nodes N1–N27 is shown. The coordinates of the server nodes correspond to the nodes X, Y, Z position within the cube. Having assigned coordinates to the nodes, dividing the nodes into request sets and announce sets can be accomplished in many different ways. The simplest allocation would be to utilize each X,Y plane as a request set and each Z line (i.e. nodes sharing the same X coordinate) as an announce set for the node at the intersection of the line and the plane. Thus, the request set US3 for N1 includes all the nodes having the same Z coordinate as N1, namely N1–N9, and the announce set RS3 for N1 includes all the nodes having the same X and Y coordinates as N1, namely N1, N10, and N19.

Once a node has been assigned to a request set and an announce set, the node will inform the other members of its announce set of its associated resources and of any updates or changes thereto, and will respond to queries for resources not associated with the node itself by querying other nodes in its request set.

If further information is available about the resource or index being announced and the global resource set (or a subset thereof), the method and architecture described above can be advantageously extended. For example, if there exists any ordering relation (preferably a total order, although partial orders are sufficient) on the members of the global resource set (or a subset thereof), then in an extended embodiment, the assigned members of each announce set maintain (at least) range information for the ordered subset of resources announced for that set. In this manner, the ordering on the subset of the global resource set is mapped to form an ordering relation on the server nodes comprising the announce set. Well known techniques exist (for example "binary search" or "bucket sort") to perform efficient lookup on an ordered set, which could be thereby utilized within the present invention.

In a further embodiment of the present invention, the announcement and lookup/access of resources is enhanced by including the art of "Byzantine agreement" protocols. (See for example the paper by M. Pease, R. Shostak and L. Lamport "Reaching Agreement in the Presence of Faults", Journal of the ACM, volume 27 number 2, pages 228–234, April 1980.) In a large network, "rogue" nodes may become part of any given request set. Such rogue nodes are prone to providing incorrect information when a request is made for a resource. To address this problem, embodiments of the present invention may be extended such that requests for location of a desired resource are handled by redundantly querying more than one of the request sets. A voting algorithm can be employed to select the majority response, which is more often correct if the number of rogue nodes is limited. As will be recognized by those of skill in the art in light of the teachings herein, by use of Byzantine agreement protocols the present invention can tolerate one or more rogue nodes providing incorrect information, and still produce the correct result.

Figure 3:
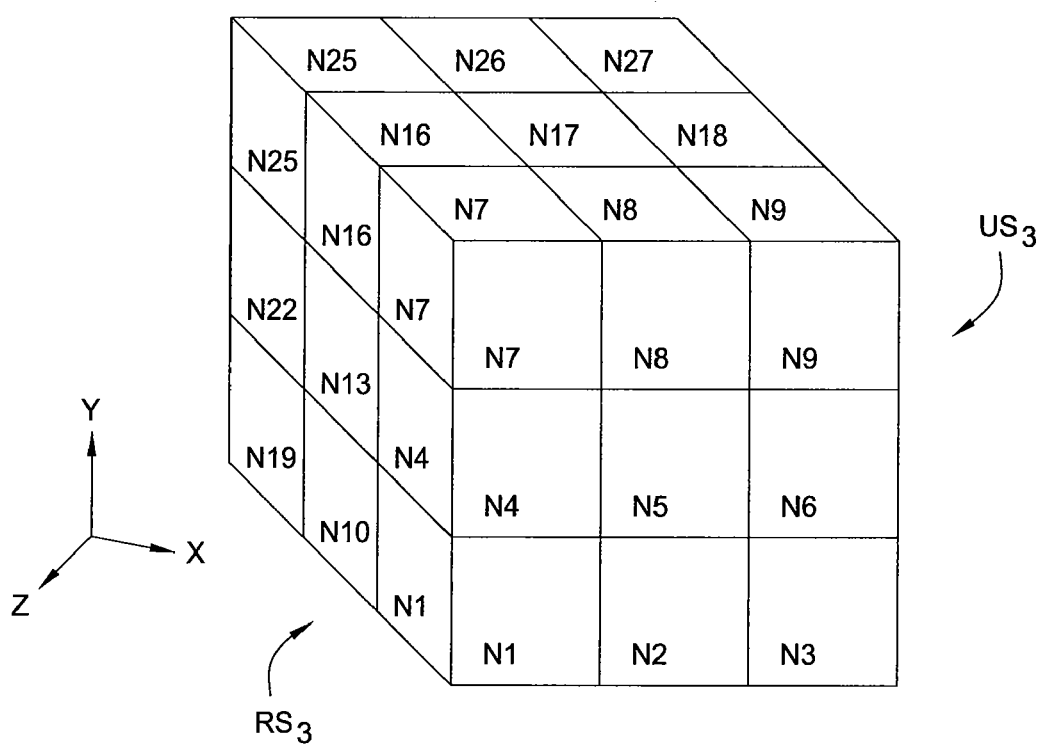
FIG. 3 is a view of a logical 3×3×3 cube showing the coordinates assigned to server nodes.
Figure 5:
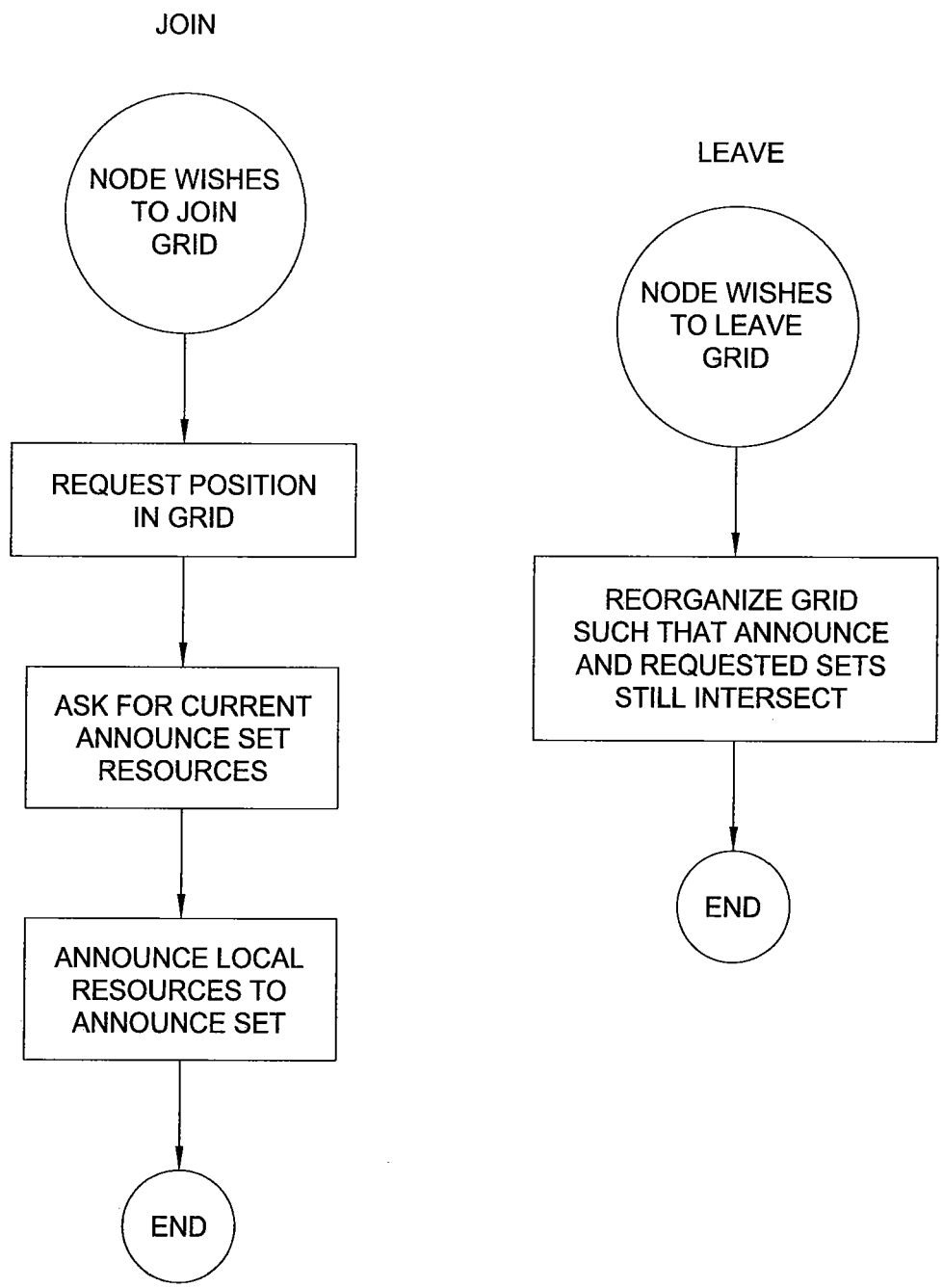
FIG. 5 is a flow diagram of a method in accordance with the present invention.

In a further aspect of the present invention, server nodes may be dynamically added and removed to the grids of FIG. 2 or 3. In FIG. 5 an example joining and leaving scenario is presented with the assumption that the server nodes comprise individual user machines, and each machine comprises a resource list showing files that a user is willing to share with other users. If a new user is added as a server node, then it will be assigned a grid position and hence membership in a request set and an announce set. The list of files (resource directory) on the user's machine will be transmitted to the nodes/other users in its announce set, and the contents of their resource directories (there should only be one common directory duplicated on each node in the announce set) will be provided to the user machine so that it will have a directory of the resources provided by each node in its announce set. Leaving the grid involves simply reassigning one or more server nodes such that the announce sets and request sets still intersect as required.

It is contemplated, in further embodiments of the present invention, that users outside the grid, i.e., users other than those whose machines are acting as server nodes, may also access the system. Such users may or may not receive a resource directory from the storage nodes. In one embodiment, the user may simply be provided a list of request set nodes to query in order to locate desired resources, but need not have a view of all the resources available on the announce set nodes and their corresponding request sets. In another embodiment, the user may be allowed to "piggyback" on a particular server node so as to have visibility to that server node's resource directory. In yet another embodiment, the user may be provided with a static "snapshot" of a resource directory but it will not receive subsequent updates until/unless another "snapshot" is requested.

It is preferred that protocols be established for nodes entering and leaving so as to ensure that the resource directory on a newly added node corresponds to that of the other members of its announce set and to prevent holes in the grid from occurring when a node leaves.

Multi-grid implementations are also contemplated, in further embodiments of the present invention. In such embodiments, each individual grid follows the structure and principles described above. For example, each of the request sets making up a particular grid intersects each one of the announce sets making up that grid. However, the global resource set may be distributed among associated server nodes that are allocated among different grids. Therefore, while there are many possible multi-grid embodiments, some further strategy or approach is preferably implemented in such embodiments in order to maintain the property that resource requests are guaranteed to be fulfilled if the desired resource exists somewhere within the global resource set. One approach is to forward (or "re-request") any unsatisfied requests to at least one request set from a second grid, continuing if necessary to further grids until the resource is located. Alternative multi-grid variations may forward a resource request to request sets from multiple grids simultaneously, such as where parallel processing of such requests can be effectively executed. Further variations may forward announce messages instead of, or in addition to, request messages.

The enhancements and alternative embodiments discussed earlier, such as the use of ordering techniques to enable further efficiency in resource location, generally may also be applied to multi-grid embodiments, as will be apparent to those of skill in the art in light of these teachings.

In a further preferred embodiment, the server nodes comprise all or part of an "edge" network. An edge network is one that includes more than 20 nodes, at least several of those nodes being physically separated from each other by a distance of at least 1 km, and where the edge network nodes are communicatively coupled via data channels that are faster by at least an order of magnitude than the speed of connection between the edge nodes and at least one or more non-edge network nodes. For example, a typical edge network might be a group of geographically distributed Internet servers connected to each other by relatively high-speed lines (such as dedicated leased lines). A "private edge network" is an edge network whose nodes are under the management and control of a single entity (such as a corporation or partnership, for example). Many edge networks have arisen or been constructed out of a desire to provide improved network infrastructure for delivering content across the Internet to multitudes of geographically diffuse end-users. (See, for example, the methods of Digital Island at http://www.digisle.net/and Akamai at http://www.akamai.com.) In current approaches, such content is typically replicated and/or cached across the multiple edge network nodes with the result that every node in the edge network is able to provide any information that is served by the edge network as a whole. This requires a priori knowledge of the origin location of such information, either for on-demand caching or for preemptive replication. However, by incorporation and use of the present invention, a distributed directory of serviced resources can be held across the edge network, such that when an end-user requests access to particular resources the edge network will locate and provide access to the desired resource very efficiently, in accordance with the methods and architecture of the present invention as described above. Thus, the assignment of server nodes with a grid configuration in the present invention can be implemented to account for the physical geographic location of the server nodes.

Although the methods disclosed herein may be used on generalized storage networks comprising various numbers of nodes, greatest leverage is likely realized in networks comprising relatively large numbers of nodes, because of the scalability of the approach described. Thus it is contemplated that the total number of nodes may exceed 25, 100, 1,000, 100,000, or even 1,000,000. As a result, logical grid coordinate values may advantageously exceed 5, 10, 100, 1000, or more.

Thus, advantages offered by the present invention include:

"Distributed"—It increases the availability of resource location information, and avoids the bottleneck (and single-point-of-failure vulnerability) that is characteristic of current approaches that store a global resource directory on a centralized server node. Distributed services can be more scalable, more efficient, more available (through fault and intrusion tolerance), and more secure than localized services.

"Internet Scale"—The system will support for Internet scale communities. IPv6 (Internet Protocol, Version 6 Specification), JXTA (Juxtapose), and Gnutella UUDI contemplate addressing up to 2128 devices or services.

"Multihierarchical"—No single name-based hierarchy is imposed on the structure of the network. Multihierarchical systems allow multiple conflicting viewpoints of organization to be superposed for efficiency, structure, and function.

"Efficient"—The present system reduces the synchronization/update burden entailed by solutions that replicate copies of a global resource directory (or the resources themselves) over multiple server nodes.

"Reliable"—When a resource is published by a member of the network, the present system maximizes the probability that the published resource will be located if it is requested.

"Responsive"—The present system greatly accelerates resource lookup as contrasted with solutions in which resource location queries potentially must be broadcast to all server nodes in the network in order to locate a desired resource.

In addition to the various embodiments described above, alternative embodiments are contemplated and include, but are not necessarily limited to, the following:

Practitioners of skill in the art will recognize that the present invention is generally applicable to the distribution and retrieval of distributable resources, as well as resource index information. Distributable resources include resources that can be copied and transmitted across a network, including but not limited to data files, application code, web pages and databases. Furthermore, the present invention is likewise applicable to systems employing replication of resources, wherein it is desirable to efficiently locate all server nodes which currently hold a replicated copy of a resource, to allow the replications of the resource to either be purged or updated to reflect the new state of the updated resource.

It should be noted that the present invention focuses on distributed directories for distributed resources. Broadly, a directory is a mapping from some description of a resource, to the location or other information about a resource. The notion of location can be generalized to include any manner of satisfying the request.

In one embodiment, the present invention focuses on URI (Universal Resource Identifiers) as the notion of location. A resource description can include simple text strings like "King Lear", Jini service descriptions, or hashes computed from such strings or descriptions.

Referring to FIG. 2, each node in the diagram can be perceived as a directory server, which generally will be a single physical computer with good network connectivity. Each set of servers, represented as a horizontal cloud, is a relatively well connected set of directory servers, all of which can reach each other member of the set. The set of sets of servers, represented as the entire rectangle, is the entire network. Each node may maintain several data structures such as an ID (IP address), a local resource lookup table (list of resource descriptions and their associated URIs), a list of server IDs in its set or horizontal column, a list of server IDs in other sets, one per set, an estimate of the total number of nodes in the system, an estimate of the total number of sets, a list of estimates of the size of each set, and a peer to contact in case the current set is split.

A directory server may learn of a resource and its location (URI) through various means. For example, the directory server might itself contain some resource of interest, such as a digital copy of the 1681 printing of Shakespear's King Lear. Alternately, some other machine (not a directory server of FIG. 2) may contact a node within FIG. 2 with a resource description and location, such as "2001 PVS manuals"⇒ "http://pvs.csl.sri.com/manuals.html". The directory server then registers this resource and its URI in its own local lookup table, and sends the resource description and its location to one server in each other set. The receiving servers in the other sets do not forward on the new resource information to all members of their sets. Thus, a server might have a list of local resources that contains "1681 printing of Shakespear's King Lear"⇒ "http: //NEVRLATE-17.csl.sri.com/KingLear.html" and "2001 PVS manuals"⇒ "http: //pvs.csl.sri.com/manuals.html".

When a directory server is queried about the location of resources, e.g., "What PVS manuals are available?", it sends the query out to all the servers in its set. Since every resource known to the overall system is registered in some server in every set, every resource description is matched against the query and hits are returned.

Thus, in contrast to approaches relying on time-to-live (TTL) or "geographic" restrictions on publication and query propagation, after time for propagation delay, once a resource description is submitted to the system, all future related lookups will discover that resource.

Figure 6:
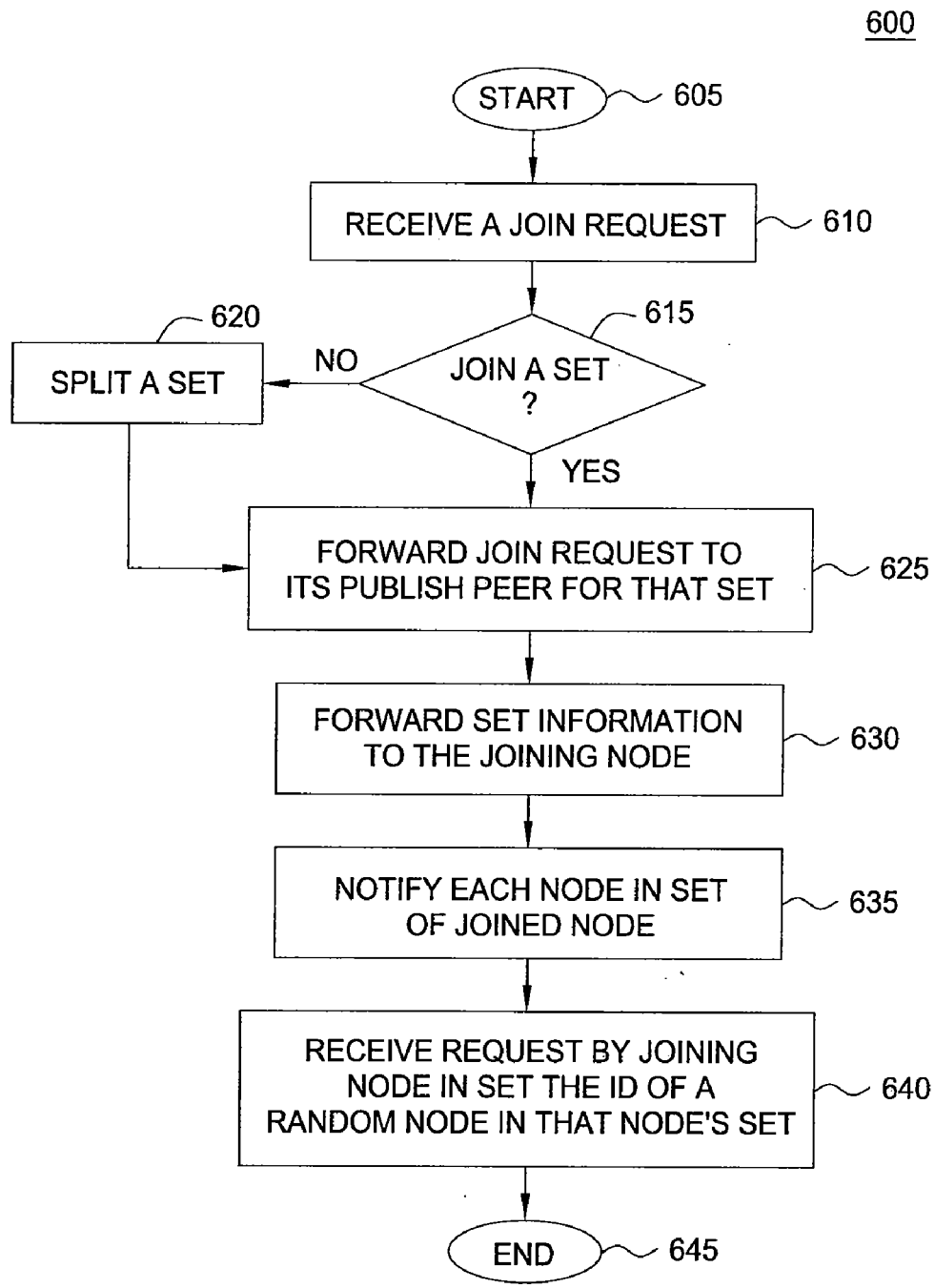
FIG. 6 illustrates a flowchart for joining a network or system of the present invention.

FIG. 6 illustrates a flowchart of a method or protocol 600 for joining a network or system of the present invention. It should be noted that the flowchart is provided from the perspective of the network, but those skilled in the art will realize that a complementary flowchart can be deduced for the joining node's perspective from the description of FIG. 6 as provided below.

Specifically, method 600 starts in step 605 and proceeds to step 610 where a join request is received by the overall network that a node wishes to join the network. In practice, the joining node will send a "join request" to an arbitrary node in the network (in the same way that resource lookup requests are made).

In step 615, method 600 queries whether there is a set within the network that the requesting node will be able to join. If the query is affirmatively answered, then method 600 proceeds to step 625. If the query is negatively answered, then method 600 proceeds to step 620, where a set is split.

Specifically, the receiving node uses its current estimates of the sizes of each set in the network to determine where (to which set) the joining node should be assigned to best maintain network balance. In the process, it may determine that the number of sets needs to be increased, possibly resulting in a set splitting operation of step 620 (described below).

In step 625, after determining the set to which the joining node will be assigned, the receiving node forwards the join request to its publish peer for that set (which may be itself), referred to as the target node.

In step 630, the target node then sends set information to the joining node such as the IDs of all the nodes in its set and the IDs of all its publish peers (one node in every other set).

In step 635, the joining node then joins the target node's set by notifying each node in the set.

Finally, in step 640, the joining node forms its own set of publish peers by requesting from each node in the set the ID of a random node in that node's set. In the process, each node in the set replaces the ID of its publish peer for the joining node's set with the ID of the joining node. This ensures both that the joining node becomes a publish peer of another node (and thus can receive publish requests that populate it with resource directory entries) and that there is diversity among the publish peer sets of the nodes in any given set. The latter property is important in maintaining viable publish peer sets when nodes leave the network. Initially, the joining node's portion of the resource directory is empty, and it will be populated with resource directory entries only by receiving publish requests.

To maintain acceptable dimensions in the network, it is sometimes necessary to increase the number of sets. To increase the number of sets while maintaining an acceptable range of set sizes, the network uses a set splitting operation (step 620) to divide one set into two sets of roughly equal size. Of course, the two sets produced in this manner are incomplete with neither maintaining the complete directory.

To address this issue, each node in each division of the split records the ID of a node in the other division. When a lookup request to a node in one division cannot be answered by that division, it is forwarded to the other division, and the results are then stored by a node in the first division in addition to being returned to the querier. If a set resulting from an earlier split is subsequently split, only information pertaining to the latest such split is maintained directly, and any remaining incompleteness in the directory in those sets after possible multiple splits is handled in a manner similar to that of lost nodes (described below).

Just as the number of sets may need to be increased as the network grows, the number of sets may also need to be decreased as nodes leave the network. To reduce the number of sets in the network, the network uses set absorption, whereby an existing set (perhaps an incomplete set or one of smaller cardinality) is simply recycled by eliminating the entire set and rejoining each node from that set into the network as a fresh node.

Unlike joining the network, which always happens as the result of an explicit request, a node may leave the network either explicitly (by notification) or implicitly (by failure). In either case, two main problems must be addressed: (1) the loss to the leaving node's set of the leaving node's portion of the resource directory, and (2) the potential loss of a publish peer for nodes in other sets.

The first problem poses a significant challenge. The leaving node's portion of the directory may be quite large and, hence, costly to recover. Even if the node leaves explicitly, it would need to communicate (distribute) its portion of the directory to the remaining members of its set.

But if the node fails, this sort of full recovery is not even an option. One solution is to ignore the full recovery issue, and instead enhances the lookup protocol to perform incremental, on-demand recovery, in which lookup requests unanswerable by an incomplete node set are forwarded to another set (or sets) and the answers added to the first set. Another solution is to rely on other approaches to fault tolerance, such as replication, as described below.

The solution to the second problem is essentially the same whether the leaving node leaves explicitly or implicitly. Only the nodes that have the leaving node as a publish peer know it, and thus they cannot be explicitly notified when the leaving node leaves the network. Instead, the nodes that have the leaving node as a publish peer must infer the loss of the leaving node from the failure of the publish protocol. Upon realizing the failure, each such node can determine a replacement publish peer for the leaving node's set by querying the members of its own set. Since the join protocol ensures that some member of the set will have a publish peer different from the leaving node, all nodes will continue to have a complete set of publish peers after the leaving node has left the network.

In the present system, searching for an available resource is performed by querying every server in the querying node's set, yielding an $O(\sqrt{n})$ lookup cost, where n represents a number of server nodes in the network. This cost is necessary because even if the resource has been published, it is difficult to identify which node in the set has this knowledge. However, by introducing some basic knowledge of "what belongs where" and depending on very low flux of nodes into and out of the network, the present invention can reduce the $O(\sqrt{n})$ cost to about $O(\log n)$ or $O(1)$.

Specifically, many resources have a natural ordering relation; for example, telephone numbers can be ordered by <= over the natural numbers and song titles by lexicographic ordering. For any collection of resources that have a defined ordering (or can be hashed into a sequential linear finite order), the present system can overlay that ordering on the members of the set, thereby creating a sequence of server nodes in each set. Enforcement of the ordering is performed at publication time, by inserting the new resource on any server that maintains the ordering within the sequence. Lookup is then performed by binary search, yielding worst-case $O(\log n)$ lookup.

Optimizing this approach, the present system can define subsets of the ordering range for which each server in the sequence is responsible in a manner similar to "bucket sort". An example for teaching this sorting technique is disclosed by Donald E. Knuth, "The Art of Computer Programming, Vol 3: Sorting and Searching" (1973).

The servers can be assigned ranges within the ordering, and requests are published directly to the node responsible for that region of the ordering. Lookup requests can subsequently be directed immediately to the responsible server, thereby yielding a constant cost of lookup in the usual case. When the resource descriptions are hashes of information, approaches similar to LH* for distributed linear hashing can be used to manage distributed growing hash tables.

In declaring each server in the set to be responsible for a particular part of the ordering, the system made no assumptions on the distribution of resources within the ordering. In one embodiment, a reasonable approach is to make the subsets of the ordering equal in size, but if more is known about the distribution of resources within the ordering, the subsets could be of differing sizes that are optimized so that the number of resources known to each server is approximately equal. However, such distribution of the resources themselves may not yield important information. In fact, the queries for the available resources may actually yield more relevant information. If a certain pattern of queries is expected, the resources may be balanced across servers to make the number of queries to each server approximately equal.

Ordered search optimizations of the network are particularly effective when the membership is static. In a system with a dynamic membership, the join/leave protocols must be enhanced to maintain the orderings imposed. In a system with a small join/leave rate, simple variations on the protocols described earlier will suffice, but in highly dynamic systems, the overhead required to hand off responsibility may well overwhelm the publish/query traffic.

To cope with highly dynamic systems, further optimizations of the network may utilize a ramped hashing approach. In the first optimization, the system balances the resource index size or balancing the query load, with implicit assumptions of equal reliability and stability of the servers in the set. This could be considered equivalent to a hashing function with a flat distribution. If these assumptions are flawed, the system will need an allocation of resources to servers that favors stable servers that have good network connectivity, and have been in the network for a long period of time. Introducing this approach, a ramped (or curved) distribution from the hashing function is obtained. A non-flat assignment of hashing function results to servers can be advantageous in general for distributed linear hashing. Furthermore, the curvature of the hashing function can be dynamic itself, i.e., responsive to the current join/leave rates, the profile of resources published, and the queries being performed.

The disclosure so far has assumed that the resource index is an association of key/value pairs and that lookup corresponds to equality of the given key with some stored key. The present invention is not restricted to such a simple approach to resource discovery. A more general approach is to allow the query to contain both a key and an equivalence function. Commonly used equivalences could be predefined in the system (e.g., soundex matching, congruence, substring matching, approximate or probabilistic matches, and equality under multiple interpreted theories) and others could be specified by regular expressions, or using a general-purpose programming/scripting language. These equivalences might be used implicitly, while other equivalences might be sent explicitly with the query.

One embodiment of the present invention involves the use of the network to provide distributed lookup services for software agents. An agent can use the network to publish a description of its capabilities, similar to the Jini lookup service for local area networks, a description of its API, or a formal description of the input-output relation. Lookup of agents can be very simple and direct (exact match for name or exact match on API), or can be done in a delegation-based computing style.

Delegation-based computing presumes the availability of a large set of agents that have published a machine-readable description of the service that they can perform in some logic. Agents are invoked by some process delegating some computation, described as a goal in that same logic. A facilitating service then attempts to prove the goal from the published axioms representing capabilities of agents using logical inference. A successful proof can then be read as a plan for the agents to be invoked. The logic involved can be as simple as propositional classical logic (which might reflect the types of arguments, like Integer and String), first-order classical logic (where input-output relation might be defined), or more exotic logics like higher-order logic (where one can reason about programs that take programs as arguments) and linear logic (or other resource-sensitive logics).

The present invention provides a scalable means to publish such logical descriptions of agent capabilities, and then to perform distributed facilitation of agent-based computing. For example, one can delegate a mathematical expression "38+sqrt (16)" and an agent that knows how to evaluate sqrt may be invoked to reduce "sqrt 16" to "4", and an agent that knows how to evaluate addition can be invoked on the result to produce the final answer of "42" which is returned as the result. A more substantial example might involve large bioinformatic calculations involving publicly available databases of proteomic strings, certain Boyer-Moore fast string-matching or BLAST agents, and certain other evaluation agents to choose among many matches. Thus, the present invention provides global reach (if there is an agent able to compute something somewhere in the network, it will be found) and efficiency. It should be noted, that agents may or may not be mobile. An agent might provide an interface to a large immobile database, or it might be a stateless bit of code that can be copied arbitrarily, or it might be mobile and contain state that should not be copied, but that can be moved. Such agents may comprise a web service or an interface to a web service.

In one embodiment of the present invention, scalable resource discovery is achieved by partitioning the global resource set into categories, and providing a resource discovery mechanism for each category or some collection of categories. A meta-process directs queries to the relevant resource discovery mechanism, minimizing the amount of resource space that must be searched to locate items of interest. Any type of categorization may be used, for example, semantic, geographical, or perhaps network-connectivity oriented.

To enable collections of systems of the present invention to cooperate in such a manner, a meta-protocol is used to locate resources on peer-grids. Resource publication is still maintained locally within the grid, but if a resource cannot be found on the current grid, the request may be forwarded to any number of peer-grids. This is placed under user control, so that the query may be forwarded to specified alternate grids. The forwarding protocol has an effect similar to the TTL on queries in Gnutella, where queries are forwarded for a specified number of hops.

A large distributed system is susceptible to faults of various kinds with the most common failure mode being the temporary unavailability of peer servers. While faults like this are unpredictable, it is reasonable to assume that they occur at random and are therefore localized.

A simple strategy that protects against random server faults in the present network is based on redundancy while publishing content. Nodes register their content with more than one server in each set, and in the case of ordered sets, more than one server shares the responsibility for any subset of the ordering.

Following redundant publication, lookup will succeed when any one of the servers that knows about the resource responds. Furthermore, if a lookup fails, perhaps because all the nodes on that column which knew about that resource are temporarily unavailable, then the lookup process may incrementally query more sets. Since faults are assumed to occur independently and at random, the probability that a resource lookup will fail decreases exponentially with the number of sets queried, as well as with the number of servers in each set published to.

Maintaining the redundant publication of resources property following node failure and departure follows a process similar to the earlier described protocols for the system. The departure of a node in a fault-tolerant system of the present invention might not affect the span of the resource directory as the lost information may already be present with different members of its set. However, to be resilient against multiple failures in a set, a node can share the intersection of its directory entries with the entries of the departing node, with a randomly chosen small subset of members in its set. Moreover, as in the basic system, the lookup protocol may be enhanced to provide incremental, on-demand recovery in case some of the lost information had not been duplicated within the departing node's set.

Security requirements for a peer-to-peer system are often unspecified. Consequently, "security" breaches may happen at different levels and may be perceived differently by different users. Of paramount importance to the user of such a system is the quality of service, where a degradation of which might be caused by either inefficient protocols or malicious behavior.

The present network has been designed to be agnostic as to underlying security provisions. Specific security functionality such as authentication, access control, auditing, and secure communication is not directly addressed in the protocols and is assumed to be provided by lower-level network functionality (or deliberately ignored).

The present system may potentially be abused by malicious users who 1) publish nonexistent resources, 2) publish resources with misleading descriptions, 3) make casual resource requests, and 4) provide Byzantine responses to queries. The first scenario aims to waste storage capacity in the system, thereby reducing available storage for legitimate resource index entries, and to waste user time in following dead-end links. The second scenario aims to deceive users into retrieving undesired resources (perhaps viruses or competing company information (e.g., publishing "Pepsi" ⇒http://www. Coke.com) or to overload a particular server by directing popular requests to their sites. The third scenario aims to overload the directory service resources servicing useless lookups, thereby reducing the quality of experience for legitimate queries. The final scenario involves a member of the network deliberately transmitting faulty information in response to user requests.

Such denial-of-service and denial-of-quality-of-service attacks may be mounted against any general directory service, and the system of the present invention is also susceptible to them. General content tracking and auditing mechanisms including watermarking and quality-of-service ratings for the directory nodes can enforce "good-citizen" behavior from participants in the present system. Bandwidth-based queuing algorithms, well studied in the general networking literature, may be used to assure fairness among competing requests at directory nodes, and thwart resource starvation attacks. With additional expense, redundant queries could be performed, and hybrid Byzantine-agreement algorithms could be employed. Furthermore, authentication of publishers, servers, and subscribers could be employed to reduce the possibility of a distributed denial of service (DDOS) attack.

Although various embodiments which incorporate the teachings of the present invention have been shown and described in detail herein, those skilled in the art can readily devise many other varied embodiments that still incorporate these teachings.

What is claimed is:

1. A method for facilitating access to a plurality of resources distributed across an electronic network comprising a plurality of interconnected server nodes, each of the resources being associated with at least one corresponding server node, said method comprising the steps of:
   a) assigning to each of the server nodes membership in at least one of a plurality of announce sets, each of said plurality of announce sets comprising two or more of said server nodes who advertise an availablity of associated resources to each other;
   b) assigning to each of the server nodes membership in at least one of a plurality of request sets, each of said plurality of request sets comprising two or more of said server nodes who query each other for an availability of one or more associated resources, where each of the request sets intersects with at least one of the announce sets thereby forming a logical grid;
   c) receiving a join request from a new server node for joining the network by a member server node of the network; and
   d) applying information stored within said member server node to determine how said new server node will be assigned membership to said network.

2. The method of claim 1, further comprising the step of:
   c) publishing a resource of a server node that has not been assigned membership in one of said plurality of announce sets or one of said plurality of request sets.

3. The method of claim 1 wherein said applying step d) applies information relating to sizes of said plurality of announce sets and request sets within the network to determine a proper set for said new server node to join.

4. The method of claim 1 further comprising the step of:
   e) splitting one of said plurality of request sets into two request sets; and
   f) assigning said new server node with membership to one of said newly split request sets.

5. The method of claim 1 further comprising the step of:
   e) splitting one of said plurality of announce sets into two announce sets; and
   f) assigning said new server node with membership to one of said newly split announce sets.

6. The method of claim 1 further comprising the step of:
   f) forwarding said join request to a server node that serves as a publish peer of said member server node.

7. The method of claim 6, further comprising the step of:
   g) forwarding request set information or announce set information to said new server node.

8. The method of claim 7, wherein said set information comprises identification of other server nodes within the set and identification of the set's publish peers.

9. The method of claim 7, further comprising the step of:
   h) receiving a request from said new server node directed to each node in the set to provide a random node in that node's set for allowing said new server node to form its own set of publish peers.

10. The method of claim 1, wherein said assigning steps a) and b) assign server nodes such that a ratio of the number announce sets and the number of request sets is held within a target ratio.

11. The method of claim 10, wherein said target ratio varies dynamically depending on a ratio of announce to request actions.

12. The method of claim 1, further comprising the steps of:
   c) detecting loss of membership of a server node within a first request set of said plurality of request sets; and
   d) forwarding a lookup request that is unanswerable by said first request set to at least a second request set of said plurality of request sets, where an answer provided by said second request set is appended to said first request set.

13. The method of claim 1, further comprising the steps of:
   c) detecting loss of membership of a leaving server node within an announce set of said plurality of announce sets by detecting a failure to respond to a publish request; and
   d) determining a replacement publish peer server node for said leaving server node's set by querying members of its own request set.

14. The method of claim 1, further comprising the step of:
   c) splitting one of said plurality of request sets into a first request set and a second request set.

15. The method of claim 14, further comprising the step of:
   d) forwarding a lookup request that is unanswerable by said first request set to at least said second request set, where an answer provided by said second request set is added to said first request set.

16. The method of claim 1, further comprising the step of:
   c) splitting one of said plurality of announce sets.

17. The method of claim 1, further comprising the step of:
   c) merging a first request set of said plurality of request sets into another request set of said plurality of request sets.

18. The method of claim 1, wherein said merging step c) treats each of a plurality of server nodes belonging to said first request set as a new server node joining the network.

19. The method of claim 1, further comprising the step of:
   c) merging a first announce set of said plurality of announce sets into another announce set of said plurality of announce sets.

20. The method of claim 19, wherein said merging step c) treats each of a plurality of server nodes belong to said first announce set as a new server node joining the network.

21. The method of claim 1, further comprising the step of:
   c) assigning a searching order to said server nodes of one of said request sets.

22. The method of claim 21, wherein said searching order is assigned to achieve a target search time.

23. The method of claim 22, wherein said target search time is a constant search time.

24. The method of claim 22, wherein said target search time is represented approximately by log(n), where n represents a number of server nodes in the network.

25. The method of claim 21, wherein said searching order is defined into a plurality of subsets of an ordering range, where each server node within a set is responsible for one of said subsets of the ordering range.

26. The method of claim 25, wherein said subsets of an ordering range are of equal size or of differing sizes.

27. The method of claim 1, further comprising the step of:
   c) providing resource announcements to more than one announce set.

28. The method of claim 1, further comprising the step of:
   c) providing resource requests to more than one request set.

29. The method of claim 1, further comprising the step of:
   c) providing resource announcement that comprises an equivalence function.

30. The method of claim 29, wherein said equivalence function is representative of a description of a software agent's capabilities.

31. The method of claim 30, wherein a requested resource is satisfied by delegation-based computing where a collection of agents are invoked to satisfy said request.

32. The method of claim 31, wherein said requested resource does not exist within the network but a composite response by said collection of agents satisfy the requested resource.

33. The method of claim of 3, wherein said requested resource comprises a web service.

34. The method of claim 1, further comprising the step of:
   c) providing resource announcement that comprises a declarative functional language.

35. The method of claim 1, wherein said assigning steps account for physical geographic location of said server nodes.

36. The method of claim 35, wherein said physical geographic location of said server nodes is used to organize server nodes into a plurality of grids.

37. The method of claim 1, further comprising the steps of:
   c) repeating steps a) and b) to produce two separate peer-grid networks; and
   d) applying a meta-process for directing queries between said peer-grid networks.

38. The method of claim 1, further comprising the steps of:
   c) distributing publishing content of a server node to more than one other server node within each of said announce sets.

39. An apparatus for facilitating access to a plurality of resources distributed across an electronic network comprising a plurality of interconnected server nodes, each of the resources being associated with at least one corresponding server node, said system comprising:
   means for assigning to each of the server nodes membership in at least one of a plurality of announce sets, each of stud plurality of announce sets comprising two or more of said server nodes who advertise an availability of associated resources to each other;
   means for assigning to each of the server nodes membership in at least one of a plurality of request sets, each of said plurality of request sets comprising two or more of said server nodes who query each other for an availability of one or more associated resources, where each of the request sets intersects with at least one of the announce sets thereby forming a logical grid;
   means for receiving a join request from a new server node for ioining the network by a member server node of the network; and
   means for applying information stored within said member server node to determine how said new server node will be assigned membership to said network.

40. The apparatus of claim 39, further comprising:
   means for publishing a resource of a server node that has not been assigned membership in one of said plurality of announce sets or one of said plurality of request sets.

41. The apparatus of claim 39, wherein said applying means applies information relating to sizes of said plurality of announce sets and request sets within the network to determine a proper set for said new server node to join.

42. The apparatus of claim 39, further comprising:
   means for splitting one of said plurality of request sets into two request sets; and
   means for assigning said new server node with membership to one of said newly spilt request sets.

43. The apparatus of claim 39, further comprising:
   means for splitting one of said plurality of announce sets into two announce sets; and
   means for assigning said new server node with membership to one of said newly split announce sets.

44. The apparatus of claim 39, further comprising:
   means for forwarding said join request to a server node that serves as a publish peer of said member server node.

45. The apparatus of claim 44, further comprising:
   means for forwarding request set information or announce set information to said new server node.

46. The apparatus of claim 45, wherein said set information comprises identification of other server nodes within the set and identification of the set's publish peers.

47. The apparatus of claim 45, further comprising:
   means for receiving a request from said new server node directed to each node in the set to provide a random node in that node's set for allowing said new server node to form its own set of publish peers.

48. The apparatus of claim 39, wherein said assigning means assign server nodes such that a ratio of the number announce sets and the number of request sets is held within a target ratio.

49. The apparatus of claim 48, wherein said target ratio varies dynamically depending on a ratio of announce to request actions.

50. The apparatus of claim 39, further comprising:
   means for detecting loss of membership of a server node within a first request set of said plurality of request sets; and
   means for forwarding a lookup request that is unanswerable by said first request set to at least a second request set of said plurality of request sets, where an answer provided by said second request set is appended to said first request set.

51. The apparatus of claim 39, further comprising:
   means for detecting loss of membership of a leaving server node within an announce set of said plurality of announce sets by detecting a failure to respond to a publish request; and
   means for determining a replacement publish peer server node for said leaving server node's set by querying members of its own request set.

52. The apparatus of claim 39, further comprising:
   means for splitting one of said plurality of request sets into a first request set and a second request set.

53. The apparatus of claim 52, further comprising:
   means for forwarding a lookup request that is unanswerable by said first request set to at least said second request set, where an answer provided by said second request set is added to said first request set.

54. The apparatus of claim 39, further comprising:
   means for splitting one of said plurality of announce sets.

55. The apparatus of claim 3, further comprising:
   means for merging a first request set of said plurality of request sets into another request set of said plurality of request sets.

56. The apparatus of claim 55, wherein said merging means treats each of a plurality of server nodes belonging to said first request set as a new server node joining the network.

57. The apparatus of claim 39, further comprising:
   means for merging a first announce set of said plurality of announce sets into another announce set of said plurality of announce sets.

58. The apparatus of claim 57, wherein said merging means treats each of a plurality of server nodes belong to said first announce set as a new server node joining the network.

59. The apparatus of claim 39, further comprising:
means for assigning a searching order to said server nodes of one of said request sets.

60. The apparatus of claim 59, wherein said searching order is assigned to achieve a target search time.

61. The apparatus of claim 60, wherein said target search time is a constant search time.

62. The apparatus of claim 60, wherein said target search time is represented approximately by log(n), where n represents a number of server nodes in the network.

63. The apparatus of claim 59, wherein said searching order is defined into a plurality of subsets of an ordering range, where each server node within a set is responsible for one of said subsets of the ordering range.

64. The apparatus of claim 63, wherein said subsets of an ordering range are of equal size or of differing sizes.

65. The apparatus of claim 39, further comprising:
means for providing resource announcements to more than one announce set.

66. The apparatus of claim 39, further comprising:
means for providing resource requests to more than one request set.

67. The apparatus of claim 39, further comprising:
means for providing resource announcement that comprises an equivalence function.

68. The apparatus of claim 67, wherein said equivalence function is representative of a description of a software agent's capabilities.

69. The apparatus of claim 68, wherein a requested resource is satisfied by delegation-based computing where a collection of agents are invoked to satisfy said request.

70. The apparatus of claim 69, wherein said requested resource does not exist within the network but a composite response by said collection of agents satisfy the requested resource.

71. The apparatus of claim of 69, wherein said requested resource comprises a web service.

72. The apparatus of claim 39, further comprising:
means for providing resource announcement that comprises a declarative functional language.

73. The apparatus of claim 39, wherein said assigning means account for physical geographic location of said server nodes.

74. The apparatus of claim 73, wherein said physical geographic location of said server nodes is used to organize server nodes into a plurality of grids.

75. The apparatus of claim 39, wherein said assigning means produce two separate peer-grid networks and said apparatus further comprising means for applying a meta-process for directing queries between said peer-grid networks.

76. The apparatus of claim 39, further comprising:
means for distributing publishing content of a server node to more than one other server node within each of said announce sets.

77. A computer-readable medium having stored thereon a plurality of instructions, the plurality of instructions Including instructions which, when executed by a processor, cause the processor to perform a method for facilitating access to a plurality of resources distributed across an electronic network comprising a plurality of interconnected server nodes, each of the resources being associated with at least one corresponding server node, said method comprising the steps of:
a) assigning to each of the server nodes membership in at least one of a plurality of announce sets, each of said plurality of announce sets comprising or more of said server nodes who advertise an availability_ of associated resources to each other;
b) assigning to each of the sever nodes membership in at least one of a plurality of request sets, each of said plurality of request sets comprising two or more of said server nodes who query each other for an availability of one or more associated resource, where each of the request sets intersects with at least one of the announce sets thereby forming a logical grid;
c) receiving a join request from a new server node for joining the network by a member server node of the network; and
d) applying Information stored within said member server node to determine how said new server node will be assigned membership to said network.

78. The computer-readable medium of claim 77, further comprising the step of:
c) publishing a resource of a server node that has not been assigned membership in one of said plurality of announce sets or one of said plurality of request sets.

79. The computer-readable medium of claim 77, wherein said applying step d) applies information relating to sizes of said plurality of announce sets and request sets within the network to determine a proper set for said new server node to join.

80. The computer-readable medium of claim 77, further comprising the step of:
e) splitting one of said plurality of request sets into two request sets; and
f) assigning said new sewer node with membership to one of said newly split request sets.

81. The computer-readable medium of claim 77, further comprising the step of:
e) splitting one of said plurality of announce sets into two announce sets; and
f) assigning said new server node with membership to one of said newly split announce sets.

82. The computer-readable medium of claim 77, further comprising the step of:
f) forwarding said join request to a server node that serves as a publish peer of said member server node.

83. The computer-readable medium of claim 82, further comprising the step of:
g) forwarding request set information or announce set information to said new server node.

84. The computer-readable medium of claim 83, wherein said set information comprises identification of other server nodes within the set and identification of the set's publish peers.

85. The computer-readable medium of claim 83, further comprising the step of:
h) receiving a request from said new server node directed to each node in the set to provide a random node in that node's set for allowing said new server node to form its own set of publish peers.

86. The computer-readable medium of claim 77, wherein said assigning steps a) and b) assign server nodes such that a ratio of the number announce sets and the number of request sets is held within a target ratio.

87. The computer-readable medium of claim 86, wherein said target ratio varies dynamically depending on a ratio of announce to request actions.

88. The computer-readable medium of claim 77, further comprising the steps of:
   c) detecting loss of membership of a server node within a first request set of said plurality of request sets; and
   d) forwarding a lookup request that is unanswerable by said first request set to at least a second request set of said plurality of request sets, where an answer provided by said second request set is appended to said first request set.

89. The computer-readable medium of claim 77, further comprising the steps of:
   c) detecting loss of membership of a leaving server node within an announce set of said plurality of announce sets by detecting a failure to respond to a publish request; and
   d) determining a replacement publish peer server node for said leaving server node's set by querying members of its own request set.

90. The computer-readable medium of claim 77, further comprising the step of:
   c) splitting one of said plurality of request sets into a first request set and a second request set.

91. The computer-readable medium of claim 90, further comprising the step of:
   d) forwarding a lookup request that is unanswerable by said first request set to at least said second request set, where an answer provided by said second request set is added to said first request set.

92. The computer-readable medium of claim 77, further comprising the step of:
   c) splitting one of said plurality of announce sets.

93. The computer-readable medium of claim 77, further comprising the step of:
   c) merging a first request set of said plurality of request sets into another request set of said plurality of request sets.

94. The computer-readable medium of claim 93, wherein said merging step c) treats each of a plurality of server nodes belonging to said first request set as a new server node joining the network.

95. The computer-readable medium of claim 77, further comprising the step of:
   c) merging a first announce set of said plurality of announce sets into another announce set of said plurality of announce sets.

96. The computer-readable medium of claim 95, wherein said merging step c) treats each of a plurality of server nodes belong to said first announce set as a new server node joining the network.

97. The computer-readable medium of claim 77, further comprising the step of:
   c) assigning a searching order to said server nodes of one of said request sets.

98. The computer-readable medium of claim 97, wherein said searching order is assigned to achieve a target search time.

99. The computer-readable medium of claim 98, wherein said target search time is a constant search time.

100. The computer-readable medium of claim 98, wherein said target search time is represented approximately by log(n), where n represents a number of server nodes in the network.

101. The computer-readable medium of claim 97, wherein said searching order is defined into a plurality of subsets of an ordering range, where each server node within a set is responsible for one of said subsets of the ordering range.

102. The computer-readable medium of claim 101, wherein said subsets of an ordering range are of equal size or of differing sizes.

103. The computer-readable medium of claim 77, further comprising the step of:
   c) providing resource announcements to more than one announce set.

104. The computer-readable medium of claim 77, further comprising the step of:
   c) providing resource requests to more than one request set.

105. The computer-readable medium of claim 77, further comprising the step of:
   c) providing resource announcement that comprises an equivalence function.

106. The computer-readable medium of claim 105, wherein said equivalence function is representative of a description of a software agent's capabilities.

107. The computer-readable medium of claim 106, wherein a requested resource is satisfied by delegation-based computing where a collection of agents are invoked to satisfy said request.

108. The computer-readable medium of claim 107, wherein said requested resource does not exist within the network but a composite response by said collection of agents satisfy the requested resource.

109. The computer-readable medium of claim of 107, wherein said requested resource comprises a web service.

110. The computer-readable medium of claim 77, further comprising the step of:
   c) providing resource announcement that comprises a declarative functional language.

111. The computer-readable medium of claim 77, wherein said assigning steps account for physical geographic location of said server nodes.

112. The computer-readable medium of claim 111, wherein said physical geographic location of said server nodes is used to organize server nodes into a plurality of grids.

113. The computer-readable medium of claim 77, further comprising the steps of:
   c) repeating steps a) and b) to produce two separate peer-grid networks; and
   d) applying a meta-process for directing queries between said peer-grid networks.

114. The computer-readable medium of claim 77, further comprising the steps of:
   c) distributing publishing content of a server node to more than one other server node within each of said announce sets.

* * * * *